July 8, 1952     A. L. CHRISTIANSEN     2,602,183
FISH DIRECTING MACHINE

Filed Sept. 29, 1949     3 Sheets-Sheet 1

Inventor:
Andrew L. Christiansen
By William B. Hall
Attorney.

July 8, 1952 — A. L. CHRISTIANSEN — 2,602,183
FISH DIRECTING MACHINE
Filed Sept. 29, 1949 — 3 Sheets-Sheet 2

Inventor:
Andrew L.
Christiansen
By William B. Hall
Attorney.

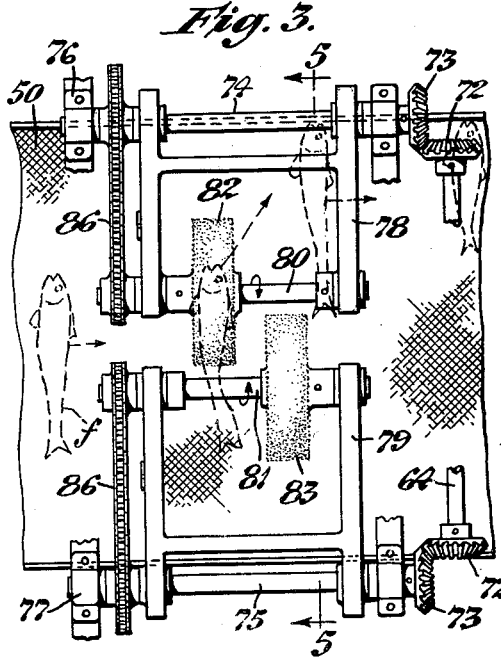

Patented July 8, 1952

2,602,183

UNITED STATES PATENT OFFICE 2,602,183

FISH DIRECTING MACHINE

Andrew L. Christiansen, Compton, Calif.

Application September 29, 1949, Serial No. 118,649

14 Claims. (Cl. 17—2)

This invention relates generally to fish processing machines used in canneries for processing and canning fish, and particularly to a machine, hereinafter referred to as a fish directing machine, employed for placing the fish in the positions necessary to operate upon them in subsequent processing machines.

In the processing of fish in canneries, it is the usual practice to dump loads of the sardines, anchovies, mackerel, and other fish, haphazardly onto a table, or other support, where workers sort the fish and arrange them in the same order, that is, with their heads pointed in the same direction, and place them on a conveyor which carries them through a machine operative to sever the heads and tails therefrom and clean the same preparatory to cooking. The operation of sorting the fish and directing the same in the proper order is a laborious and costly one, and various expedients have been devised for eliminating this manual operation. However, such fish directing or positioning machines have been quite complicated and costly to produce, besides being inefficient and undependable in operation.

It is therefore an object of this invention to provide a fish directing machine which is adapted to receive fish, which are delivered thereto in a haphazard manner, and to place the fish in the order necessary to operate upon them in a subsequent machine of the fish processing system.

Another object of the invention is to provide a fish directing machine which functions to first cause the fish to assume a side-by-side relationship with their heads directed in either direction, and to thereafter move the fish transversely and simultaneously in the direction of their heads so that some fish are moved in one direction while others are moved in the opposite direction to form two lines of fish, the fish of each line being positioned in the same direction and opposite to the fish of the other line. This object is best attained by providing a centrifugally operated means for causing the fish to assume the side-by-side relationship, and for delivering the fish in this condition onto a traveling conveyor above which is a pair of counter-rotating brushes, the bristles of which engage the upper sides of the fish moving forwardly with the conveyor. The brushes rotate on axes disposed parallel to the direction of feed of the fish, and their bristles are capable of moving fish headlong only when they engage the rearward edges of the scales of the fish, the bristles otherwise sliding over the scales and effecting no lengthwise movement of the fish. By this arrangement all the fish are moved headlong from the central portion of the conveyor toward either longitudinal edge of the conveyor, and thus are arranged in two orderly rows.

In accordance with another object, the invention further provides a delivery conveyor from which the fish are transferred from the directing conveyor, the delivery conveyor having a plurality of transverse grooves, each capable of supporting a fish in position with its sides vertical. The improved machine also includes guiding means which functions to turn the fish as they are ejected from the directing conveyor and deposit them in the proper position in the grooves of the delivery conveyor, which transports the fish to a mechanism for cutting and cleaning them.

Further objects are set forth in the following specification which describes a preferred embodiment of the machine, by way of example, as illustrated by the accompanying drawings. In the drawings:

Fig. 3 is a fragmentary plan view of the directing conveyor and brushes, illustrating the manner in which a fish is moved headlong by one brush toward one longitudinal edge of the conveyor;

Fig. 4 is a view similar to Fig. 3, and indicating the manner in which the other brush is moved headlong toward the other longitudinal edge of the conveyor;

Fig. 5 is a cross-sectional view, taken on line 5—5 of Fig. 3; and

Fig. 6 is a cross-sectional view, taken on line 6—6 of Fig. 4.

Figure 1:
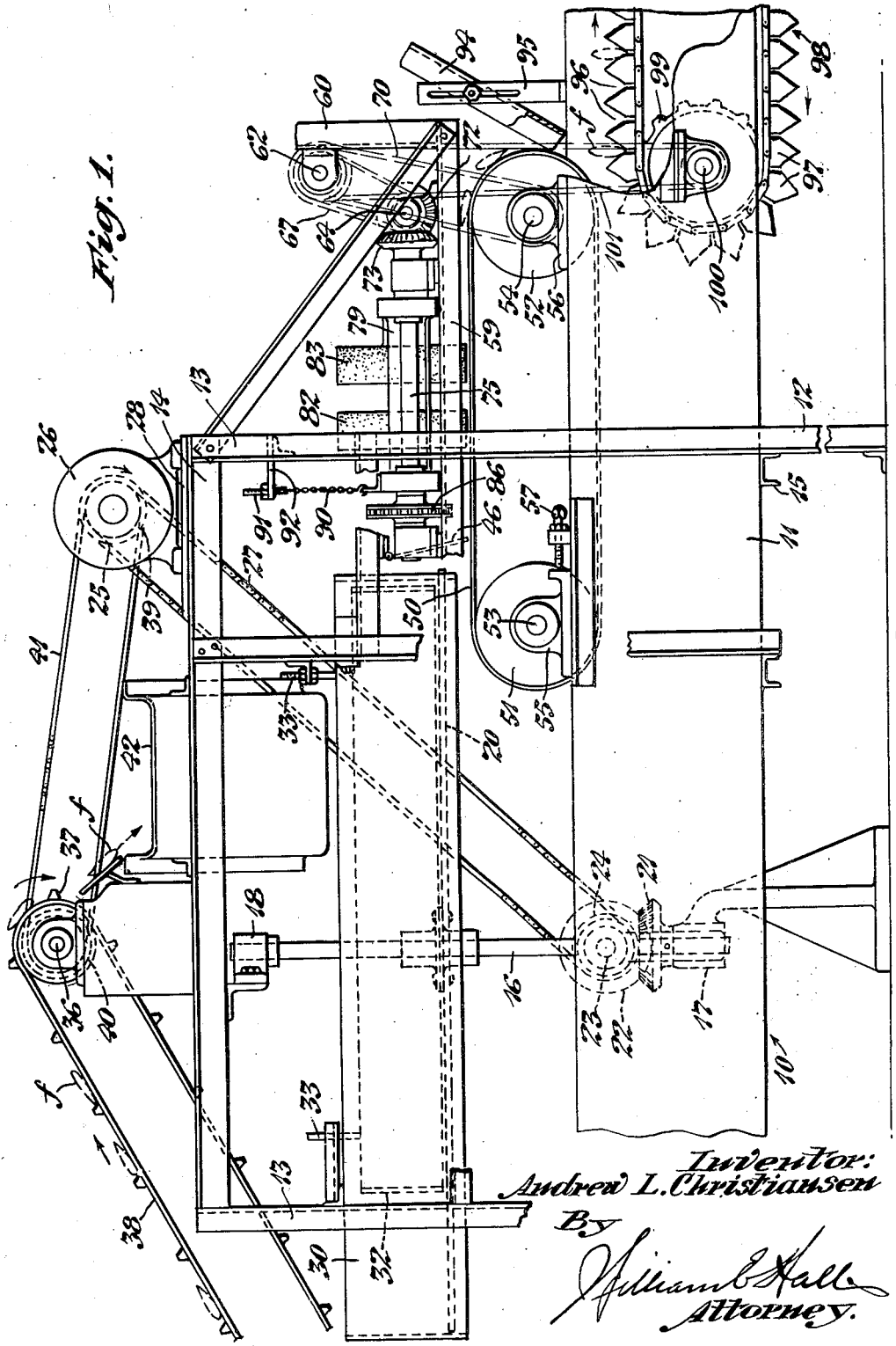
Fig. 1 is a side elevational view of the fish directing machine.

Referring to the drawings in detail, the fish directing machine comprises a frame 10 which includes longitudinal side rails 11 supported above the floor by legs 12. The legs are extended upwardly in uprights or stanchions 13 which are connected by strips 14. The rails 11 are held in spaced relation by cross struts 15.

Figure 2:
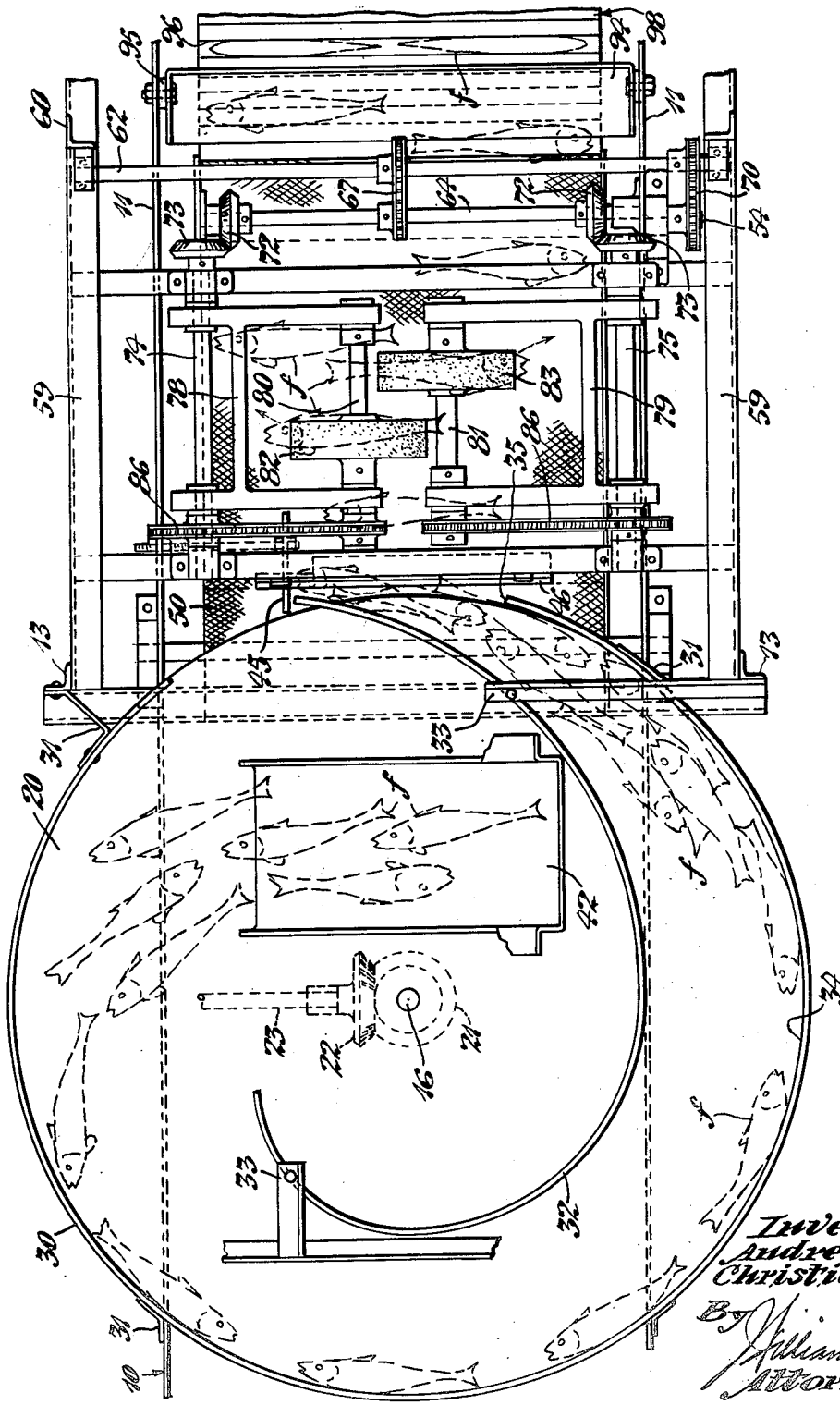
Fig. 2 is a plan view of the same.

Carried by a vertical shaft 16, journaled in a bearing member 17 and a bracket 18, is a centrifugally operative positioning member in the form of a large disc 20. The shaft 16 carries a bevel gear 21 which meshes with a similar gear 22 on a cross shaft 23. The shaft 23 carries a sprocket 24 by which it is driven from a sprocket 25 on the shaft of an electric motor 26 through the medium of a chain 27, the motor being mounted on a cross member 28 at the upper portion of the machine frame 10. Partially surrounding the disc 20 is an arcuate outer wall 30 which is supported by brackets 31 (Fig. 2).

Spaced radially inward from the wall 30 is an inner wall 32 which is carried by brackets 33. The wall 32 is volute or scroll-like in plan view and co-operates with the arcuate wall 30 in providing a volute guide 34 extending throughout substantially one-half the circumference of the rotatable disc 20 which forms the bottom wall of the guide. The rearward edge of the wall 30 terminates at one side of the centerline of the machine while the corresponding edge of the wall 32 extends to a point at the other side of the centerline. Thus, the two rearward edges provide between them a fish discharge opening 35 (Fig. 2).

Carried by a shaft 36 are sprockets 37 around which a loading conveyor 38 extends, the conveyor also passing around similar idler sprockets arranged close to the floor, but not shown. The shaft 36 is driven from the electric motor 26 by means of sprockets 39 and 40 and a chain 41 (Fig. 1). A hopper may be provided into which the fish to be processed are dumped, the fish then being received on the conveyor 38 and carried thereby upwardly. At the point of reversal of the conveyor 38, the fish are discharged into an inclined chute 42 through which the fish slide haphazardly onto the disc 20, as shown in Fig. 2. Upon sliding movement onto the disc 20, the fish are thrown radially outward against the wall 30 under the influence of centrifugal force, and thus are moved in an arcuate path within the guide 33 and caused to assume a position with either their backs or bellies sliding along the outer wall 30. As the fish approach the discharge opening 35 their leading ends strike a transversely adjustable stop plate 45, so that each fish so advanced by the disc 20 is disposed substantially in alignment with the centerline of the machine. The advanced fish encounter a pivoted gate 46 which functions to permit discharge of fish when a group thereof builds up at the opening 35.

Fish f thus discharged through the opening 35 are arranged with their heads pointed toward either longitudinal side of the machine, the fish being discharged onto an endless directing conveyor 50 which is preferably made from wire-mesh fabric. The conveyor 50 extends around pulleys 51 and 52 carried by shafts 53 and 54 journaled in brackets 55 and 56, the bracket 56 being adjustable longitudinally of the machine frame by screw means 57 (Fig. 1) to take up slack in the conveyor belt in the event that the latter stretches.

At the beginning of the longitudinal movement of the fish f with the conveyor 50, the fish are arranged in a single line at the longitudinal center of the conveyor with their heads directed toward either side edge thereof. However, during their travel with the conveyor 50, the fish are moved laterally toward the longitudinal edges of the conveyor with their heads directed outwardly, that is, in directions away from the centerline of the conveyor so as to form two rows of the fish, by means to be next described. Mounted at the end of longitudinal struts 59 of the machine frame are brackets 60 which carry bearings for the ends of a transverse shaft 62. A second transverse shaft 64 is adapted to be driven from the shaft 62 by sprockets and a chain 67. The shaft 62 also drives the shaft 54 of the conveyor 50 to drive the latter through the medium of sprockets and a chain 70. The shaft 64 carries bevel gears 72 which mesh with similar gears 73 at the ends of longitudinally extending shafts 74 and 75 disposed above and adjacent the opposite edges of the conveyor 50, these shafts being journaled in bearings 76 and 77, respectively.

The shafts 74 and 75 serve as pivots for bifurcated arms 78 and 79 which extend therefrom toward the centerline of the conveyor and above the latter. Extending between the inner ends of the arms 78 and 79, respectively, are shafts 80 and 81 to which are secured circular brushes 82 and 83 which have radial bristles, the brushes constituting fish-directing members. The shafts 80 and 81, together with the brushes 82 and 83, are rotated from the shafts 74 and 75 by means of sprockets and chains 86. Due to the system of bevel gears 72 and 73, the brushes 82 and 83 are rotated in opposite directions, as indicated by the arrows in Figs. 5 and 6, the brush 82 rotating counterclockwise and the brush 83 rotating clockwise. The lower portions of the peripheries of the brushes are disposed at a distance above the conveyor 50 which is substantially equal to the thickness of the fish being processed. Consequently, when a fish f moves into position beneath the brush 82 and its head is pointed toward the right, as viewed in Fig. 5, the tips of the bristles catch against the rearward edges of the scales of this fish and this provides sufficient contact to cause the fish to be propelled headlong toward the right where it may strike against a longitudinal guard 87. Other fish similarly directed by the brush 82 are arranged in the row which is carried forwardly by the conveyor 50.

Fish which enter the directing zone in the reverse direction, that is, with their heads pointed toward the left, as viewed in Figs. 5 and 6, merely pass under the brush 82 due to the fact that the rearward edges of their scales cannot be engaged by the bristles of the brush 82. That is to say, the bristles of the brush 82 merely slide across the scales without moving the fish. However, after these fish leave the area beneath the brush 82, they move into position to be engaged by the brush 83 which, due to the position of the scales of the fish and the clockwise rotation of the brush, cause these fish to be propelled, as indicated by the arrows in Fig. 4, and toward the left and against a guard 88, as shown in Fig. 6. By this action, all fish which have their heads pointed toward the left are moved in this direction by the brush 83 and form a row which is carried forwardly by the conveyor 50.

It is thus seen that fish entering the conveyor 50 and having their heads pointing in opposite directions are separated and moved in the direction of their heads, to be arranged in rows or lines of fish at the opposite sides of the centerline of the conveyor and to be moved forwardly by the latter.

To enable the machine to direct fish of different sizes and types, the stop plate 45 may be adjusted as previously explained. In addition, the brushes 82 and 83 may be adjusted vertically by swinging the arms 78 and 79 on their pivot shafts 74 and 75. The arms are held in their adjusted position by means of chains 90 which have their lower ends connected to the arms and their upper ends joined to screws 91 adjustable in a cross-strip 92 of the machine frame.

After being sorted and arranged in rows at the sides of the conveyor 50, the two rows of fish are advanced by this conveyor to the point where the conveyor reverses its direction of movement, that is, at the pulley 52. The fish, which are disposed flatwise on the conveyor 50, fall from the conveyor and are guided in their downward path by an inclined plate 94 which is adjustably mounted on stationary brackets 95. The fish are thus caused to fall with their sides vertical into the V-shaped grooves 96 provided between transverse elements 97 of a delivery conveyor 98. The horizontal conveyor 98 extends around a sprocket 99 on a shaft 100 and a similar sprocket (not shown) which is driven by a suitable electric motor. A chain 101, extending around a sprocket on the shaft 100, and a sprocket on the shaft 62 drives the latter and the conveyor 50 and the brushes 82 and 83 which are driven from the shaft 62. The delivery conveyor 98 transports the two rows of fish toward the right, as viewed in Fig. 1, and as the fish approach the limit of their movement in this direction they are transferred to the feeding mechanism of a cutting and cleaning machine. Since this mechanism forms no part of the present invention, it is not disclosed herein.

While the machine is herein disclosed as embodied in a preferred form of construction, by way of example, it will be apparent that modifications might be made in its structure without departing from the spirit of the invention. Consequently, without limiting myself in this respect, I claim:

1. In a machine of the class described, the combination of: a frame; a centrifugally operative positioning member rotatable on said frame; means for feeding fish to said positioning member; guide means on said frame providing a discharge opening through which the fish are discharged individually in a combined tangential and radial direction from said positioning member in a direction transversely of their length under centrifugal force; conveyor means movable on said frame in a path extending radially of the axis of rotation of said positioning member, said conveyor means having an end disposed beneath said discharge opening for receiving said discharged fish with their length extending transversely of said conveyor, said conveyor being operative to convey the fish in a direction transversely of their length; and at least one directing member rotatable above said conveyor means on an axis extending longitudinally of said conveyor means, the periphery of said directing member being engageable with the fish being conveyed therebeneath and operative to direct the fish in the direction of their length, transversely of said conveyor means.

2. In a machine of the class described, the combination of: a frame; a horizontal positioning disc rotatable on said frame; a curved stationary guide wall surrounding the periphery of said disc; a stationary curved wall having an end defining with an end of said guide wall a discharge opening; a chute for receiving fish and delivering the same substantially tangentially onto said disc, said delivered fish being moved radially outward on said disc into lengthwise engagement with said guide wall and movable therealong in the direction of rotation of said disc under the action of centrifugal force, said fish discharging radially through said discharge opening in a direction transversely of their length; a directing conveyor movable on said frame in said radial direction with respect to the axis of rotation of said disc and having an end disposed beneath said discharge opening to adapt it to receive said fish discharged from said disc with the fish disposed with their lengths extending transversely of the conveyor; and at least one directing member rotatable above said conveyor on an axis extending longitudinally of said conveyor, the periphery of said directing member being engageable with the fish being conveyed therebeneath and operative to move the fish in the direction of their length, transversely of said conveyor so as to direct the fish toward a longitudinal edge of said conveyor.

3. The combination defined in claim 2, including a pair of said directing members and in which said directing members are suspended from said frame and have engaging means on their peripheries operative to engage only the rearward edges of the scales of the fish so as to move the fish headlong toward the longitudinal edges of said conveyor.

4. The combination defined in claim 2, including a pair of said directing members and in which said directing members are rotatable on arms pivoted to said frame and are rotary brushes having substantially radial bristles engageable only with the rearward edges of the scales of the fish so as to move the fish headlong toward the longitudinal edges of said conveyor.

5. The combination defined in claim 2, including a pair of said directing members and in which said directing members are rotatable on arms pivoted to said frame and are circular brushes having substantially radial bristles engageable only with the rearward edges of the scales of the fish so as to move the fish headlong toward the longitudinal edges of said conveyor, said combination also including guide members extending longitudinally along the edges of said conveyor for retaining said directed fish on the conveyor for movement therewith.

6. The combination defined in claim 2, including a pair of said directing members and in which said directing members are rotatable on arms pivoted to said frame and are brushes having substantially radial bristles engageable only with the rearward edges of the scales of the fish so as to move the fish headlong toward the longitudinal edges of said conveyor, said combination also including adjusting means for adjusting said arms vertically toward and away from said conveyor.

7. The combination defined in claim 2, including a pair of said directing members and in which said directing members are rotary brushes having substantially radial bristles engageable with the rearward edges of the scales of the fish so as to move the fish headlong toward the longitudinal edges of said conveyor, said directing members being carried by arms pivoted on said frame, said arms normally pivoting downwardly under the action of gravity, and means for limiting the downward movement of said arms so as to dispose the peripheries of said directing members at selected distances above said conveyor.

8. In a machine of the class described, the combination of: a frame; a horizontal positioning disc rotatable on said frame; a curved, stationary wall surrounding the periphery of said disc and provided with an opening; a chute on said frame for receiving fish and delivering the same substantially tangentially onto said disc, said delivered fish being moved radially outward on said disc into lengthwise engagement with said wall and movable therealong in the direction of rotation of said disc under the action of centrifugal force, said fish discharging radially through said opening transversely of their length; a directing conveyor movable on said frame in said radial direction with respect to the axis of rotation of said disc and having an end disposed beneath said discharge opening to adapt it to receive said fish discharged from said disc with the fish disposed with their lengths extending transversely of the conveyor; a stop member adjustable transversely of said frame and against which the leading ends of the fish discharged from said disc engage to be positioned centrally of said conveyor; a gate pivoted transversely of said frame adjacent said opening and under which said fish discharged from said disc pass; at least one directing member rotatable above said conveyor on an axis extending longitudinally of said conveyor, the periphery of said directing member being engageable with the fish being conveyed therebeneath and operative to move the fish in the direction of their length, transversely of said conveyor so as to direct the fish toward a longitudinal edge of said conveyor; and adjusting means for adjusting said directing member vertically toward and away from said conveyor.

9. In a machine of the class described, the combination of: a frame; a horizontal positioning disc rotatable on said frame; a curved, stationary wall surrounding the periphery of said disc and provided with an opening; a chute on said frame for receiving fish and delivering the same substantially tangentially onto said disc, said delivered fish being moved radially outward on said disc into lengthwise engagement with said wall and movable therealong in the direction of rotation of said disc under the action of centrifugal force, said fish discharging radially through said opening transversely of their length; an endless, mesh, directing conveyor movable on said frame in said radial direction and having an end disposed beneath said opening and adapted to receive said fish discharged from said disc; a pair of directing members rotatable above said conveyor on axes extending longitudinally of said conveyor, the peripheries of said directing members being engageable with the fish being conveyed therebeneath and operative to move the fish in the direction of their length, transversely of said conveyor, said directing members being rotatable in opposite directions so as to direct the fish toward the longitudinal edges of said conveyor; and adjusting means for adjusting said directing members vertically toward and away from said conveyor.

10. The combination defined in claim 2, and including a loading conveyor movable on said frame for delivering the fish into said chute.

11. The combination defined in claim 2, and including a discharge conveyor movable on said frame in a path coextensive with said directing conveyor and below the plane of the same, said discharge conveyor having an end disposed beneath an end of said directing conveyor and being adapted to receive fish from said directing conveyor and to convey the fish to a point remote from said disc for processing.

12. The combination defined in claim 2, and including a discharge conveyor movable on said frame in a path coextensive with said directing conveyor and below the plane of the same, said discharge conveyor having an end disposed beneath an end of said directing conveyor and being adapted to receive fish from said directing conveyor and to convey the fish to a point remote from said disc for processing, said discharge conveyor having transversely extending grooves adapted to support the fish edgewise with their backs or bellies uppermost, the combination also including an inclined transfer guide element disposed between said directing conveyor and said discharge conveyor for guiding the fish from said directing conveyor downwardly onto said discharge conveyor, said element co-operating with said directing conveyor to turn said fish from a position in which their sides are horizontal to a position in which their sides are vertical so as to permit the fish to be received in said grooves of said discharge conveyor.

13. A fish positioning and delivering apparatus, comprising: a horizontal positioning disc rotatable on a vertical axis and adapted to receive fish placed thereon in a haphazard manner; a stationary, part-circular, outer guide wall extending circumferentially of said disc and providing an inner curved surface; said guide wall having an end edge, the fish being moved radially outwardly on said disc into lengthwise engagement with said surface and caused to move along said surface in response to the combined action of rotation of said disc and centrifugal force developed as a result of such rotation; and a curved, inner guide wall disposed radially inwardly of said outer guide wall and eccentrically thereof, said inner guide wall having an end edge disposed at the periphery of said disc and spaced from said end edge of said outer guide wall in the direction of rotation of said disc to define a discharge opening between said end edges; said inner and outer guide walls defining between them a curved guide channel terminating in said discharge opening, said opening being tangential to said disc.

14. A fish positioning and delivering apparatus, comprising: a horizontal positioning disc rotatable on a vertical axis and adapted to receive fish placed thereon in a haphazard manner; a stationary, part-circular, outer guide wall extending circumferentially of said disc and providing an inner curved surface, said guide wall having an end edge, the fish being moved radially outwardly on said disc into lengthwise engagement with said surface and caused to move along said surface in response to the combined action of rotation of said disc and centrifugal force developed as a result of such rotation; and a volute inner guide wall disposed radially inwardly of said outer guide wall and eccentrically thereof, said inner guide wall having an end edge disposed at the periphery of said disc and spaced from said end edge of said outer guide wall in the direction of rotation of said disc to define a discharge opening between said end edges, said inner and outer guide walls defining between them a volute guide channel terminating in said discharge opening, said opening being tangential to said disc.

ANDREW L. CHRISTIANSEN.

REFERENCES CITED

The following references are of record in the file of this patent:

UNITED STATES PATENTS

| Number | Name | Date |
| --- | --- | --- |
| 1,049,208 | Cleveland | Dec. 31, 1912 |
| 1,078,718 | Cleveland | Nov. 18, 1913 |
| 1,185,744 | Weber et al. | June 6, 1916 |
| 1,642,444 | Hovden | Sept. 13, 1927 |
| 1,967,229 | Drevitson | July 24, 1934 |

FOREIGN PATENTS

| Number | Country | Date |
| --- | --- | --- |
| 590,138 | Great Britain | July 9, 1947 |